Patented Sept. 30, 1930

1,777,247

UNITED STATES PATENT OFFICE

ERIK CHRISTIAN BAYER, OF COPENHAGEN, DENMARK

POROUS ORGANIC MATERIAL AND PROCESS OF PRODUCING THE SAME

No Drawing. Application filed January 31, 1927, Serial No. 165,047, and in Denmark February 9, 1926.

In my previously filed application No. 661,723 filed September 8, 1923, I have disclosed a method of forming porous building material by adding foam, to a grout of mineral substances which, by setting become hard, and in this state retain the bubbles of air which were embodied in the grout by means of the foam.

The present invention differs from that above set forth, and includes an insulating material and a method of making the same of organic substances. The invention consists in a method of adding a previously produced foam to a solution of these organic substances, the foam being mixed with the solution, or of adding substances, from which foam may be produced, which, when the whole mixture has been stirred, will produce in the mixture a foam, whereupon the solvent is removed, or the initial material is hardened by chemical action, so that a coherent, solid substance is formed, filled with the small air-bubbles of the foam.

It is well known that certain organic substances in solution are able to form a more or less permanent foam, but the latter will, in the most instances not be so lasting that porous organic material could be formed thereof, having any particularly high degree of porosity. By adding, according to the present invention, an auxiliary substance to such organic substances in solution which can be made to foam more easily, or a foam previously made of such substances, it will be possible to produce porous organic material, with extremely low specific gravity.

As example for the application of the method in cases where the solvent for the organic substance employed is removed, may be mentioned a family of substances including solutions of glue, chrome-gelatine, caseinates, albumins and the like, and also mixtures of such solutions, from which the solvent may be evaporated after the mass has been made foamy.

The mass may be made foamy either by an addition of foam producing substances, for example vegetable glue, gelatine, soap solution, caseinates or saponines and subsequently whipping or stirring the same, or by an addition of foam previously produced of such substances and mixing it with the organic substance. It will be obvious that in case where foam producing substances are added to the solution the latter may be made into foam by blowing air into it, or by letting a generation of air or gas proceed in the solution by means of a chemical process, for example by adding pulverized aluminium to an alkaline solution, or carbonates to an acid solution. As examples of suitable quantities of the materials to be used the following may be mentioned: 550 cubic centimeters of a 35% solution of gelatine are caused, together with the foam producing substances to fill 25 liters, and at the same time 150 cubic centimeters of a 5% solution of formaldehyde or a corresponding solution of alum are added for the purpose of hardening, and thereafter the dissolving agent, the water, is removed by drying. In this example a bubble maintaining resin soap 1.25% and glue 0.5% may be used with 98.70% of water.

As example for the application of the method in cases where the organic substance employed is hardened by a chemical process, may be mentioned copper-ammonia solutions of cellulose, solutions of viscose-cellulose and of substances related thereto, which, after having been made into foam by one of the above mentioned methods are hardened by treatment with suitable solutions of acids, bases or salts, so that a celluloselike substance is formed, which will enclose numerous small cells.

In the case of the copper ammonia solution of cellulose or other cellulose derivatives, the foam is formed in the same manner as before described. The substances are hardened by precipitating with a suitable acid basic or salt solution. As an example may be mentioned 500 cubic centimeters of viscose cellulose whipped with foam until it fills 25 liters, thereafter the hardening is effected by the addition of 50 cubic centimeters of a 20% solution of ammonia chloride.

In some cases it may be advantageous to increase the stiffness of the foam by adding glycerine or the like.

What I claim as new is:

1. The method of producing a hard, porous, organic, insulating material from a solution of organic material which consists in incorporating in said solution gaseous bubbles made from a bubble maintaining substance of the group including vegetable glue, gelatine, soap solution, caseinates or saponines and after the bubbles are intimately mixed with the solution, causing the solution to harden while the bubbles are so mixed therewith.

2. The method of producing a hard, porous, organic, insulating material from a solution of organic material which consists in incorporating in said solution gaseous bubbles made from a bubble maintaining substance of the group including vegetable glue, gelatine, soap solution, caseinates or saponines and after the bubbles are intimately mixed with the solution, causing the said organic material to harden by adding a material that will chemically combine with and harden it before the bubbles collapse and while the bubbles are so mixed therewith.

3. The method of producing a hard, porous, organic, insulating material from a solution of organic material which consists in incorporating in said solution gaseous bubbles made from a bubble maintaining substance of the group including vegetable glue, gelatine, soap solution, caseinates or saponines and after the bubbles are intimately mixed with the solution, causing the solution to harden while the bubbles are so mixed therewith by evaporating the solvent of the organic material.

4. A method of producing a hard, porous, insulating material from a solution of a group of materials including glue, chrome-gelatine, caseinates or albumins which comprises incorporating in said solution gaseous bubbles made of a bubble maintaining substance from the group of substances including vegetable glue, gelatine, soap solution caseinate or saponine and causing the solution to harden while the bubbles are incorporated therein.

5. A method of producing an organic insulating material from a solution of said organic material which comprises incorporating in said solution bubbles having bubble sustaining material and adding a material that will chemically combine with and harden said solution before the bubbles collapse.

6. A hard, porous, coherent, insulating, organic material comprising a body of material from a group of materials including glue, chrome-gelatine, caseinates or albumins, said material being impregnated with gaseous bubbles having a bubble sustaining material to stiffen the bubbles.

In testimony whereof, I have signed my name to this specification at Copenhagen, this 15th day of January 1927.

ERIK CHRISTIAN BAYER.